C. A. UFFORD.
ADJUSTABLE DRESS FORM.
APPLICATION FILED JULY 7, 1910.
1,127,946.
Patented Feb. 9, 1915.
3 SHEETS—SHEET 3.
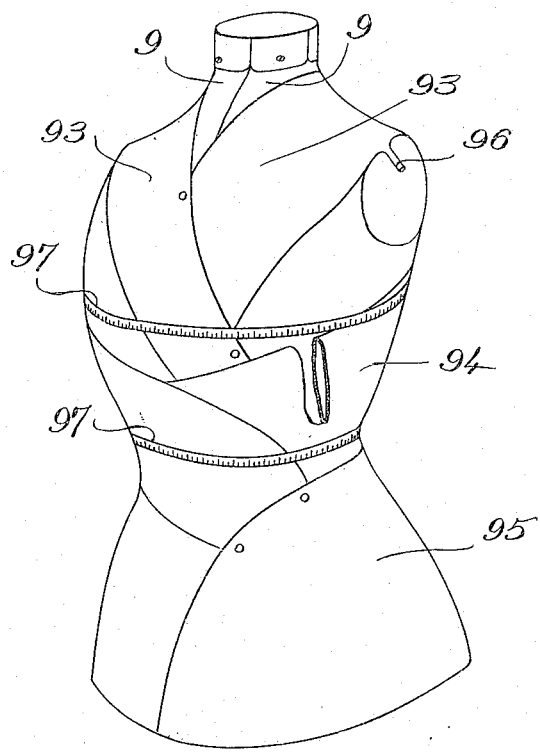

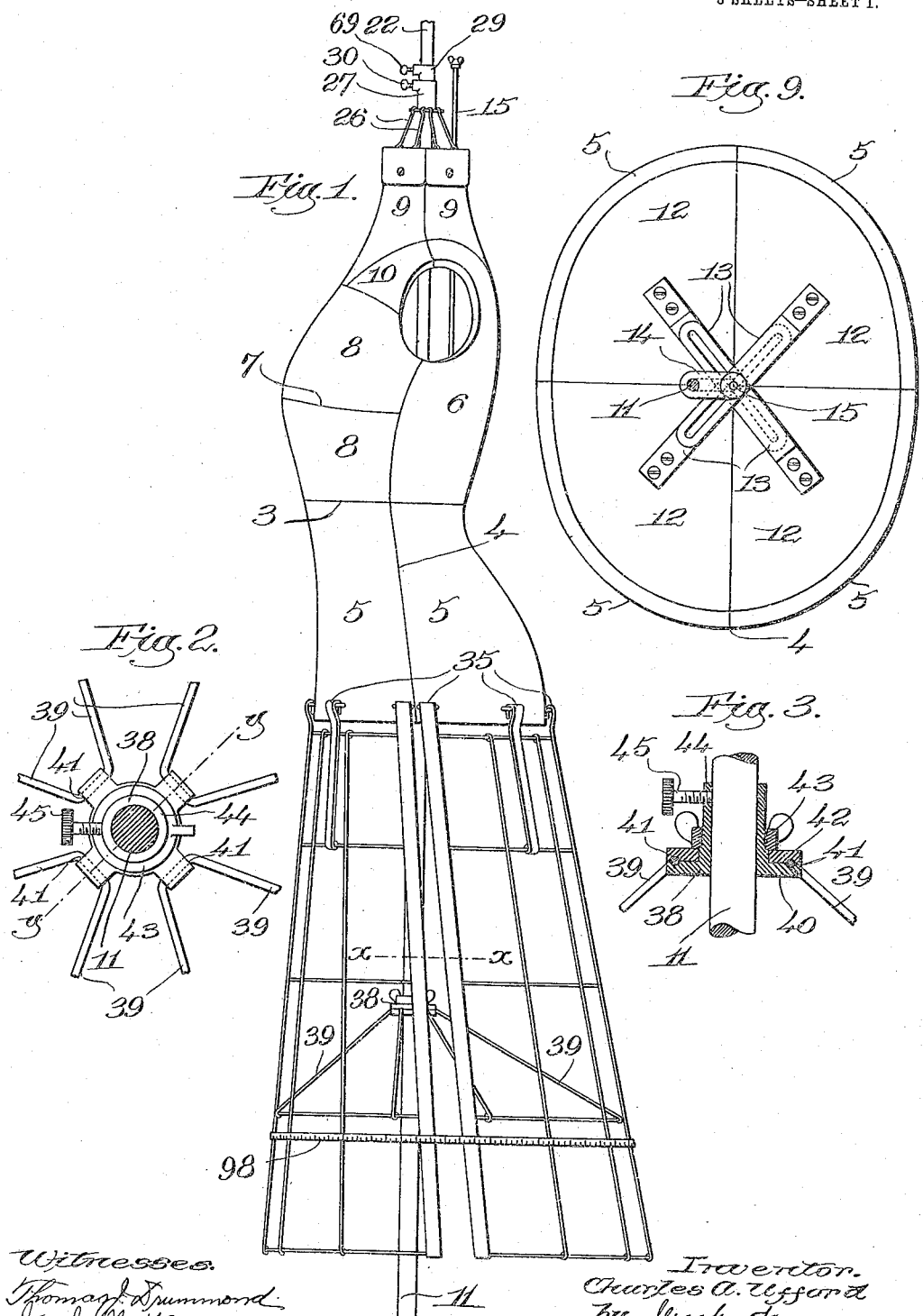
C. A. UFFORD.
ADJUSTABLE DRESS FORM.
APPLICATION FILED JULY 7, 1910.
1,127,946.
Patented Feb. 9, 1915.
3 SHEETS—SHEET 1.

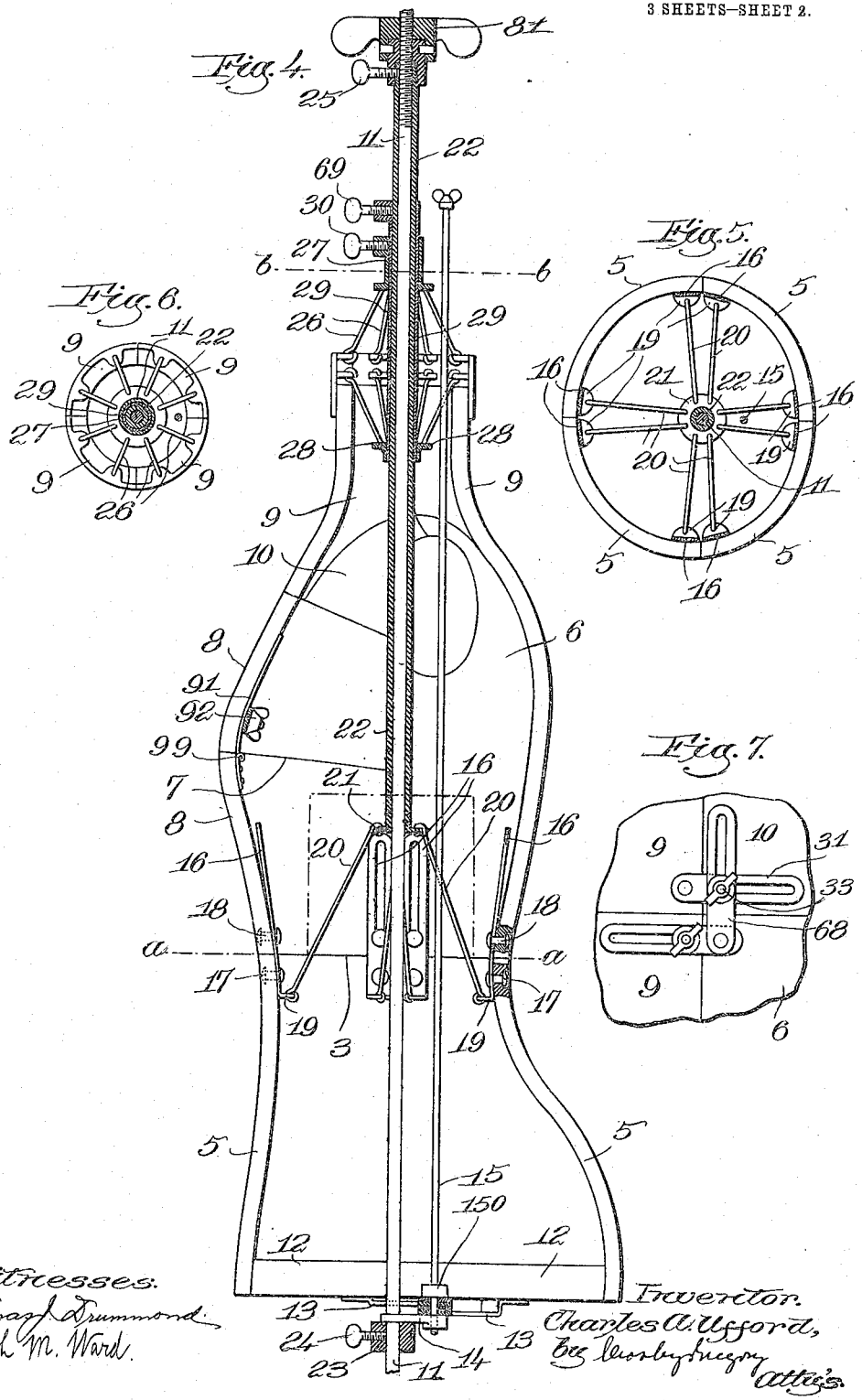

UNITED STATES PATENT OFFICE.

CHARLES A. UFFORD, OF BOSTON, MASSACHUSETTS.

ADJUSTABLE DRESS-FORM.

1,127,946.　　　　　　Specification of Letters Patent.　　　Patented Feb. 9, 1915.

Application filed July 7, 1910. Serial No. 570,713.

*To all whom it may concern:*

Be it known that I, CHARLES A. UFFORD, a citizen of the United States, residing at Boston, county of Suffolk, and State of Massachusetts, have invented an Improvement in Adjustable Dress-Forms, of which the following description, in connection with the accompanying drawing, is a specification, like characters on the drawing representing like parts.

This invention relates to adjustable dress forms of that type wherein the form is made of a plurality of sections and is provided with means whereby these sections may be adjusted relative to each other for changing the proportion and shape of the form.

The object of the invention is to provide a novel form of this type which is comparatively simple in its construction and which is arranged so that the various adjustments can be effected from the exterior of the form and also to provide other novel features, all as will be more fully hereinafter described and then pointed out in the appended claims.

Referring to the drawings, Figure 1 is a side view of a form embodying my invention; Fig. 2 is a section through the standard on the line $x-x$, Fig. 1; Fig. 3 is a section on the line $y-y$, Fig. 2; Fig. 4 is an enlarged vertical section through the waist portion of the form; Fig. 5 is a section on the line $a-a$, Fig. 4; Fig. 6 is a section on the line $b-b$, Fig. 4; Fig. 7 is a view showing the manner in which the shoulder sections are connected together; Fig. 8 is a view showing the form with inflatable sections applied thereto for giving it any desired shape; Fig. 9 is a bottom plan view of the waist portion.

The waist portion of the form herein shown is made of sections of papier mâché or other suitable material, and said waist portion may be divided in a variety of ways without departing from the invention. I have herein shown said section as divided horizontally across the waist, as at 3, and vertically on each side, as at 4, and vertically from front to rear thereby to form the four hip sections 5 and the two rear shoulder sections 6. I have also shown the form as divided horizontally across the bust, as at 7, to provide the four bust sections 8, and said form is cut so as to form the four neck sections 9 and the two front shoulder sections 10. This particular manner of dividing the form, however, is not essential to the invention.

The form as a whole is sustained by a rod 11 which may be secured in a suitable stand and which extends to the top of the form. The hip sections 5 each have secured thereto a bottom board 12 and each bottom board has fastened thereto a slotted member 13, said members being arranged to overlie each other, as shown in Fig. 9. The rod 11 has slidably mounted thereon an arm 14 into which is screw-threaded the end of a clamping rod 15 that extends up through the form and the upper end of which is accessible above the neck of the form. This clamping rod has a collar 150 thereon and it passes down through the slots in the slotted members 13. When the clamping rod is loosened, the hip sections can be adjusted to any desired size and their adjustment can be fixed by merely tightening the clamping rod thereby to clamp the member 13 between the arm 14 and the collar 150.

The sections 6 and 8 are connected to the hip sections 5 by slotted members 16 which are pivoted to the hip sections, as at 17, and are connected to the sections 6 and 8 by rivets or headed studs 18 which extend through the slots in the members. This permits the waist of the form to be lengthened by simply elevating the shoulder portion thereof.

For holding the sections 6 and 8 adjusted to any desired elevation, I have provided a novel mechanism which is operated easily from the top of the form. As herein shown each slotted member 16 is bent laterally at its lower end to present the foot 19, and said feet 19 are connected by links 20 to a collar 21 on the lower end of the tube 22 which is slidably mounted on the rod 11 and which extends up through the neck of the form. The rod 11 has adjustably mounted thereon a collar 23 provided with a clamping screw 24, which collar is normally adjusted to rest against the arm 14. The lower end of the tube 22 is situated above the feet 19 so that the links 20 converge upwardly toward said tube. By forcing the tube 22 downwardly on the rod 11 from the upper end of the form, the links 20 will cause the form to be expanded at the waist, as will be obvious, and therefore by merely adjusting this tube on the rod, the waist can be given any desired size. When the waist is properly adjusted the tube is clamped to the rod by means of a set screw 25. The collar 23 prevents the hip portion of the form from moving downwardly on the rod 11 while the size of the waist is being adjusted.

For adjusting the size of the neck, I have connected to each neck section 9 a pair of arms or links 26 which extend in opposite directions and which are pivoted to the two collars 27, 28, respectively. The collar 28 is fast to a sleeve 29 that is fitted over the tube 22, and the collar 27 is slidably mounted on the sleeve 29 and is clamped in adjusted position by a clamping screw 30. By adjusting the collar 27 on the sleeve 29 the neck can be expanded or contracted in size, as will be obvious.

From the above it will be seen that the size of the hips, the size of the waist band, and the size of the neck, as well as the length of the waist can be readily adjusted and clamped in adjusted position from the exterior of the form and while a dress or other garment is on the form. This is a decided advantage because it obviates the necessity of reaching in through the dress form for effecting the adjustment.

A clamping screw 69 holds the sleeve 29 in adjusted position.

The shoulder sections 6 and 10 are connected together and to the sections 9 by the construction shown in Fig. 7, that is, the shoulder section 6 and the front shoulder section 9 each have secured thereto a slotted member, said members being designated 68 and 31, respectively, which overlie each other and also overlie the shoulder section 10, and these slotted members are clamped together by a single clamping screw 33 carried by the shoulder section 10. This provides a means for readily adjusting the width of the shoulder.

The skirt portion is preferably made of metal and will be made in sections as usual. These sections are detachably secured to the waist portion of the form by means of suitable hooks 35 and the lower end of the skirt section is spread or adjusted in size by the runner 38 which is slidably mounted on the rod 11 and is pivotally connected to the skirt sections by the links 39. It is sometimes desirable to remove the skirt sections and to permit this to be done I have provided a novel means for detachably connecting the links 39 to the runner 38. As herein shown, said runner is provided with lateral arms 40 each having a half groove in which the bridge portion 41 of one link 39 is received, and said links are clamped to the flange 40 by a collar 42 which is held in place by a clamping screw 43 which is threaded on the neck 44 of the runner. By loosening the clamping screw 43 the links 39 may be readily removed from the runner, thus permitting the skirt sections to be detached.

A clamping screw 45 is used to hold the runner in adjusted position.

It is sometimes desirable to be able to turn the form freely around on the rod 11 and to permit this to be done without any danger that the shoulder sections will drop thereby changing the length of the waist, I have provided a collar 81 which is screw-threaded on the rod 11 and is swiveled to the upper end of the tube 22. By turning the collar 81 the tube 22 may be moved up or down on the rod 11, and said collar furnishes not only the means for moving the tube 22 vertically, but also serves to hold the tube at any desired elevation. When the set screw 25 is loosened, then the tube and the form are free to turn about the rod 11 owing to the swivel connection with the collar 81.

As stated above, my improved form is divided across the bust, as at 7, and in order to permit the bust sections 8 above and below the division line to be freely adjustable, I propose to use a hinge connection between them. As herein shown the lower member 8 has hinged thereto at 99 a slotted strap 91 which is adapted to be clamped to the upper member by a clamping screw 92. This permits vertical adjustment of the upper member and the hinge movement permits other adjustments. I have also provided an inflatable cover for the waist portion which can be placed on said portion after it has been adjusted to approximately the right size and which can be inflated to bring it to exactly the right shape and size at all points. As herein shown this inflatable cover comprises the shoulder portion 93 which wraps around the shoulders and extends down the back and is adapted to be crossed in front, as shown in Fig. 8, a waist portion or band 94 which wraps around the waist, and a hip portion 95 which wraps around the hip. Each of these sections of the cover are made of rubber or other material and are made inflatable, each being provided with a valve 96 by which it may be inflated. I propose to use tapes 97 around the bust, waist and hips if desired which will be adjusted to exactly the desired measurements, and by inflating the cover sections the form may be expanded to the desired size. I will preferably also use a tape 98 about the skirt sections, which tape when adjusted to the desired size will prevent the skirt sections from expanding.

Having fully described my invention, what I claim as new and desire to secure by Letters Patent is:—

1. In a dress form, the combination with a waist portion divided to form a plurality of hip sections and a support therefor, of an adjustable connection between the lower ends of the hip sections which permits the sections to be adjusted relative to each other, a clamp for holding said connection in adjusted position which clamp is separated from the support, and means accessible above the neck of the form for operating the clamp.

2. In a dress form, the combination with a waist portion divided to form a plurality of hip sections, of an adjustable connection between the lower ends of the hip sections which permits them to be adjusted relative to each other, a clamp for holding said connection in adjusted position, and a clamping rod extending up through the form and accessible above the neck thereof for operating the clamp.

3. In a dress form, the combination with a waist portion divided to present a plurality of hip sections, a slotted member secured to the lower end of each hip section, a clamping rod for clamping said slotted members together, said rod extending up through the form and being accessible above the neck of the form.

4. In a dress form, the combination with a waist portion made in sections and divided horizontally at the waist line, of slotted members pivoted to the sections below the waist line and having sliding pivotal connection with the sections above the waist line, each slotted member having a foot at its lower end, a rod on which said form is supported, a tube slidably mounted on the rod and accessible above the neck of the form, and links connecting said tube to the feet of the slotted members whereby movement of the tube on the rod will expand or contract the waist line.

5. In a dress form, the combination with a waist portion divided to form a plurality of hip sections, of an adjustable connection between the lower ends of the hip sections which permits said sections to be adjusted relative to each other, a clamp situated at the lower ends of said hip sections for holding the connection in adjusted position, and means accessible above the neck of the form for operating the clamp.

6. In a dress form, the combination with a waist portion, of a sectional skirt portion, a rod on which the form is supported, a runner on the rod provided with grooved arms, links pivotally connected to the skirt sections and occupying the grooves in the arms, and an adjustable clamping member to clamp the links against said arms, said clamping member being capable of adjustment to permit the links to be disconnected from the arms.

7. In a dress form, the combination with a supporting rod, of a waist portion sustained thereby and divided at the waist line and also divided vertically to form hip sections below the waist line division, a tube slidably mounted on the rod, links connecting said tube to the upper edges of the hip sections, and means on the rod and coöperating with the lower ends of the hip sections to hold the hip sections from downward movement when the tube is moved downwardly on the rod whereby such downward movement of the tube will cause the form to expand at the waist.

8. In a dress form, the combination with a supporting rod, of a waist portion sustained thereby and divided at the waist line and also divided vertically to form hip sections, a bottom board secured to each hip section, a tube slidably mounted on the rod, links connecting said tube to the upper edges of the hip sections, and a collar secured to the rod underneath the bottom board and coöperating therewith to prevent downward movement of the hip sections when the tube is pushed downwardly on the rod to expand the form at the waist.

In testimony whereof, I have signed my name to this specification, in the presence of two subscribing witnesses.

CHARLES A. UFFORD.

Witnesses:
EMILY C. HODGES,
FREDERICK S. GREENLEAF.

Copies of this patent may be obtained for five cents each, by addressing the "Commissioner of Patents, Washington, D. C."